United States Patent [19]
Geyer et al.

[11] Patent Number: 5,442,629
[45] Date of Patent: Aug. 15, 1995

[54] TOKEN RING SPEED DETECTOR

[75] Inventors: Joel E. Geyer, Cary; Joseph K. Lee, Raleigh; John M. Mullen, Wake Forest; Vernon R. Norman; Kathleen M. Wilhelm, both of Cary; Kenneth T. Wilson, Raleigh, all of N.C.

[73] Assignee: International Business Machines Corporation, Armonk, N.Y.

[21] Appl. No.: 200,989

[22] Filed: Feb. 24, 1994

[51] Int. Cl.6 .............. H04J 3/22; H04L 12/433
[52] U.S. Cl. .................. 370/84; 370/85.15
[58] Field of Search ............ 370/84.17, 85.4, 85.5, 370/85.11, 85.13, 85.14, 85.15, 85.2; 375/10, 121; 371/5.5

[56] References Cited

U.S. PATENT DOCUMENTS

| | | | |
|---|---|---|---|
| 4,567,590 | 1/1986 | Bederman | 370/85.15 |
| 4,716,575 | 12/1987 | Douros et al. | 370/85.15 |
| 4,926,415 | 5/1990 | Tawara et al. | 370/85.2 |
| 4,931,250 | 6/1990 | Greszczuk | 375/121 |
| 5,042,030 | 8/1991 | Grima et al. | 370/84 |

Primary Examiner—Douglas W. Olms
Assistant Examiner—Rickey Q. Ngo
Attorney, Agent, or Firm—Joscelyn G. Cockburn

[57] ABSTRACT

Dual detection paths containing speed recognition devices automatically determine the rate at which data is being transmitted on a multi-rate digital data communications network such as a token ring network. The multiple detection paths operate simultaneously with each detection path provided with a Phase Lock Loop (PLL) and a pattern recognition device. The PLL and its associated pattern recognition device are made to operate at one of the known ring speeds. The ring speed is determined by the detection path which is able to recognize a predetermined data pattern from the network.

20 Claims, 9 Drawing Sheets

FIG. 4A
TOKEN RING FRAME STRUCTURE (IEEE 802.6)

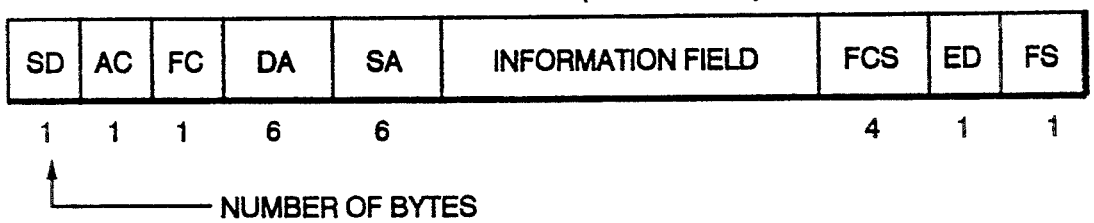

NUMBER OF BYTES

NOTES:
SD = START DELIMITER　　DA = DESTINATION ADDRESS
ED = END DELIMITER　　　SA = SOURCE ADDRESS
AC = ACCESS CONTROL FIELD　FCS = FRAME CHECK SEQUENCE
FC = FRAME CONTROL FIELD　FS = FRAME STATUS FIELD

FIG. 4B
START DELIMITER (TRANSITIONAL DATA PATTERN)

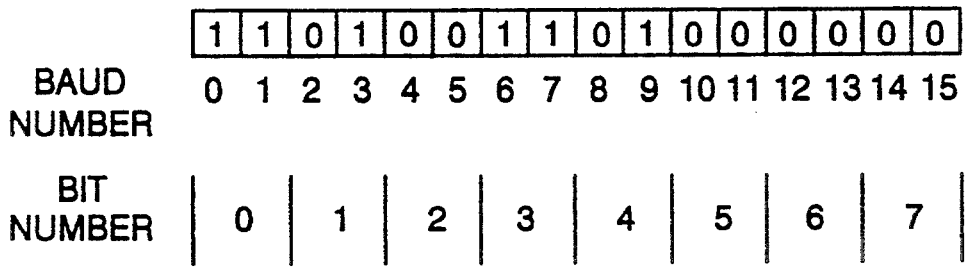

FIG. 4C
END DELIMITER (TRANSITIONAL DATA PATTERN)

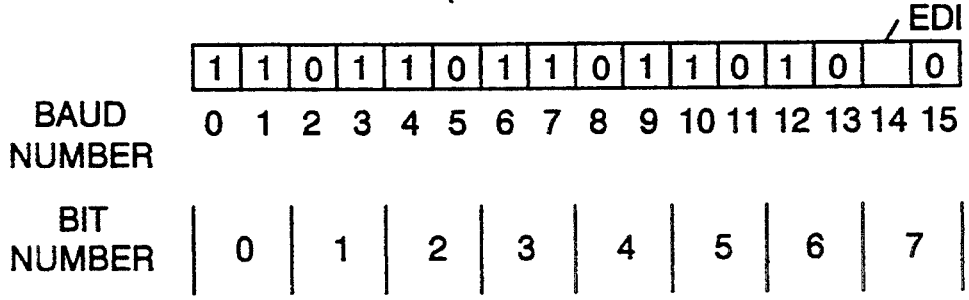

NOTE:
I = INTERMEDIATE FRAME BIT　　EDI = ERROR DETECT INDICATOR BIT
I = 0 → LAST FRAME
I = 1 → INTERMEDIATE FRAME　　EDI = 0 → NO ERROR DETECTED IN FRAME DATA

EDI = 1 → ERROR DETECTED IN FRAME DATA

FIG. 4D  FRAME STRUCTURE (IEEE 802.5)
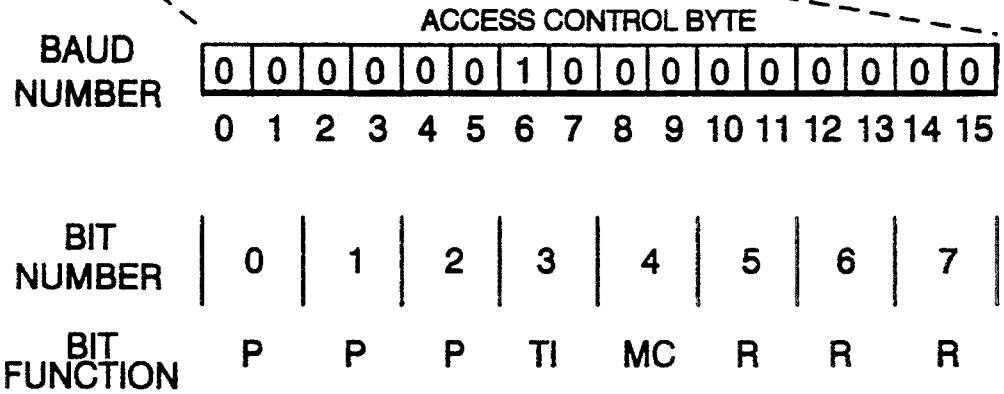
FIG. 4E  TOKEN STRUCTURE (IEEE 802.5)
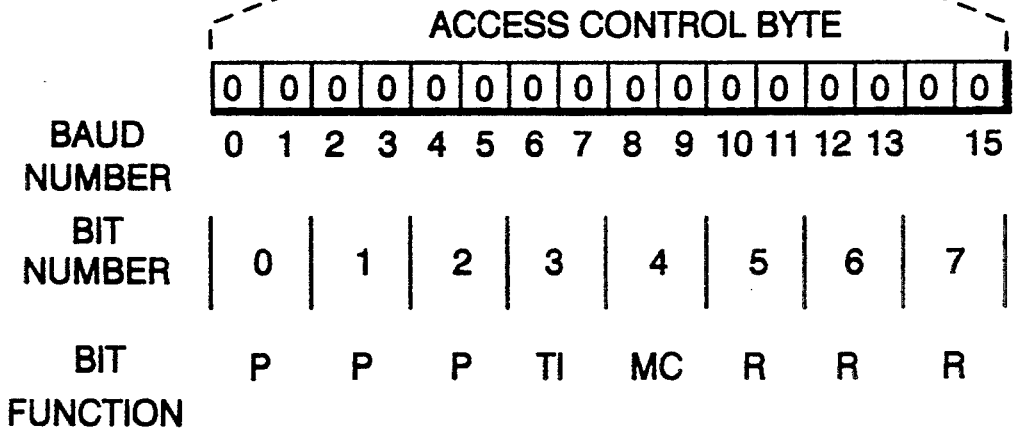
P = PRIORITY CONTROL BITS
R = RESERVATION CONTROL BITS
TI = TOKEN INDICATION BIT (0 = TOKEN, 1 = FRAME)
MC = MONITOR CONTROL BIT

|  | -RSD ENABLE | 16 TOKEN DET | PLL-16 DISABLE | PLL-4 DISBLE |
|---|---|---|---|---|
| CASE 1 | 0 | 0 | 0 | 0 |
| CASE 2 | 0 | 1 | 0 | 0 |
| CASE 3 | 1 | 0 | 1 | 0 |
| CASE 4 | 1 | 1 | 0 | 1 |

NOTE:
    SD = STARTING DELIMITER DETECT
    TI TIME = TOKEN INDICATOR BIT TIME POSITION IN AC FIELD.

CV ERRORT = AC FIELD BAUDS 1 OR 3 OR 5 = 10
    T/F = TOKEN/FRAME

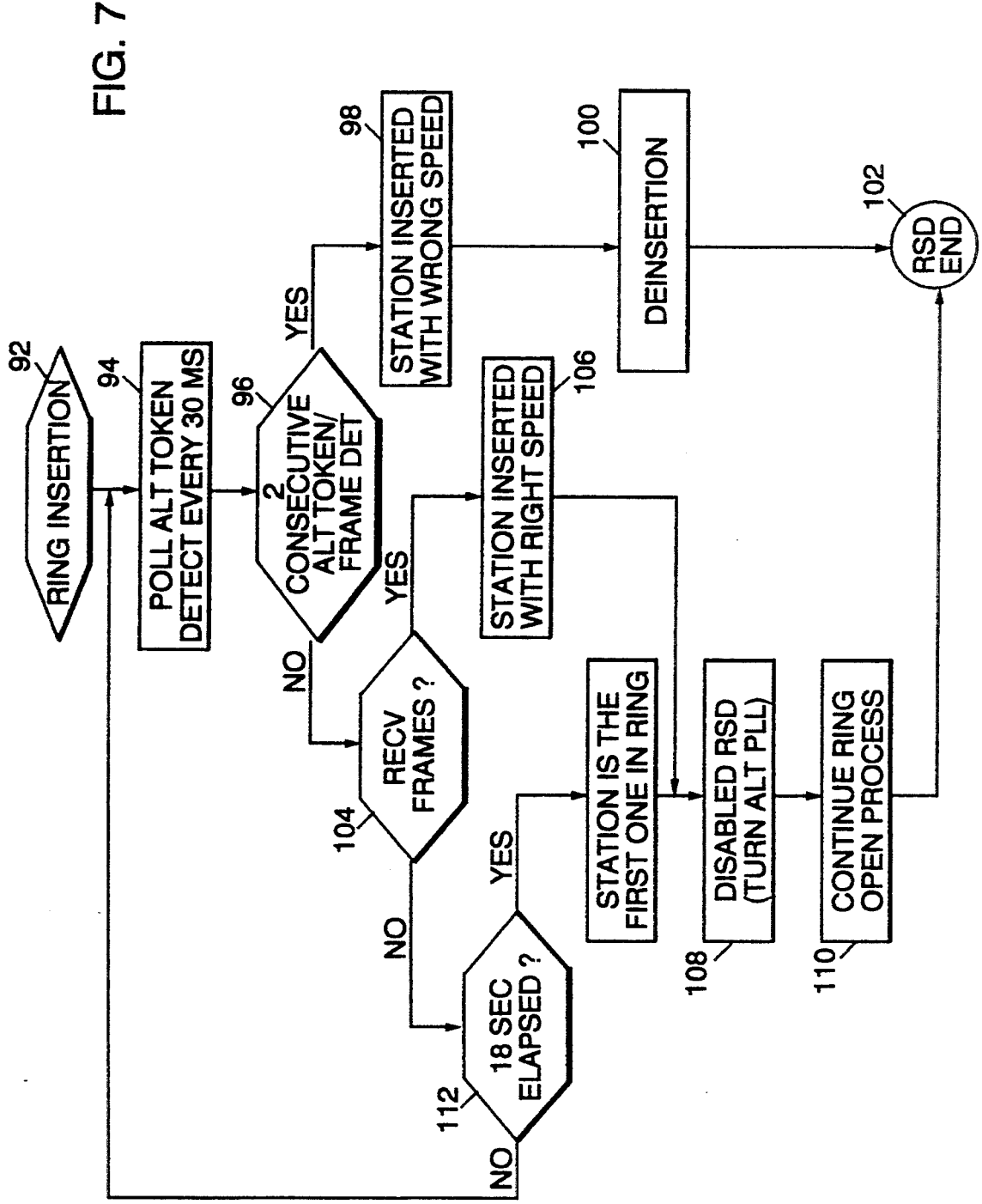

TOKEN RING SPEED DETECTOR

BACKGROUND OF THE INVENTION

CROSS REFERENCE TO RELATED PATENT APPLICATION

Patent application Ser. No. 07/979,121 filed Nov. 20, 1992, now (U.S. Pat. No. 5,371,766) entitled "Clock Extraction and Data Regeneration Logic for Multiple Speed Data Communications," assigned to the assignee of the present invention, in part, describes an apparatus and method for detecting ring speed based upon the histogram of signals recovered from the network.

1. Field of the Invention

The invention relates to communications networks in general and, in particular, to the management of local area networks (LANs).

2. Prior Art

Multi-rate digital communications networks are used as the preferred data highways to distribute information between data terminal equipment, computers, work stations or the like. Local Area Networks (LANs) are one type of multi-rate digital communications networks used to distribute information within limited geographical areas, such as college campuses, buildings or the like.

The token ring LAN is a well-known multi-rate digital network proposed by IEEE 802.5 Standards. Signal transmission on the network is unidirectional and access to the network is provided via a unique data pattern called a token. The network can operate at different speeds, for example, 4 Mbps or 16 Mbps.

Even though a token ring LAN can accommodate devices such as adapters, concentrators, bridges routers or the like operating at 4 Mbps or 16 Mbps, both speeds cannot be accommodated on the same network simultaneously. If this were to happen, network degradation due to data loss, failure to recover the token and other network problems would result.

To avoid the undesirable results, the prior art has adopted mechanisms and techniques for a device to determine the rate at which data is being transmitted on a LAN before the device inserts into the network. The most obvious approach is for a user to know the speed at which the LAN is operating and set the device to enter the network at the predetermined speed. Even though this technique works well for its intended purpose, it tends to be cumbersome, since it requires manual intervention by an operator.

In addition, the device could be set to the wrong speed due to operator's error.

Published European patent application 0425317AZ describes an interface system which detects the speed at which the network is operating by counting the frequency at which data is recovered from the network. Even though this system is a step in the right direction in that it automatically determines the ring speed, one of its drawbacks appears to be its reliability. For example, if no station is connected to the media, the system could measure the harmonics in the media and report a wrong ring speed. In fact this error condition could occur even when other stations are connected to the network.

SUMMARY OF THE INVENTION

It is a main object of the present invention to provide a more efficient apparatus and method for determining the speed of a multi-speed network.

According to the present invention, parallel circuit arrangements are set at different speeds and are made to monitor the LAN to detect a predetermined signal pattern. The LAN speed is that of the circuit arrangement which is able to detect the predetermined signal pattern on the LAN.

In particular, the ring speed detection apparatus includes a pair of clock extraction and data regeneration circuitry arranged in parallel to receive data from the network. At least two data pattern recognition devices are connected in series to respective clock extraction and data regeneration circuitries. When a station desires entry into the network, a controller activates both sets of clock extraction and data regeneration circuitry and its related data pattern recognition device. Each one of the sets is made to operate at one of the allowable ring speeds. The set which is able to detect a predetermined data pattern sets a bit in a status register. The controller then deactivates the alternate branch of the ring speed detector and thereafter the activated branch with its known speed is used to access the network.

In one feature of the invention, if the speed detector is not able to detect a pre-existing data pattern on the network, the controller concludes that no other station is in the network and the device housing the controller becomes the monitor station for the network. Stated another way, the inserting station is the first one on the network and it is free to use any one of the permissible data rates.

The foregoing and other objectives, features and advantages of the invention will be more fully described in the accompanying description of the drawings.

BRIEF DESCRIPTION OF THE DRAWINGS

FIGS. 4A-4E show graphical representations of a Token structure and frame structure according to the IEEE 802.5 Standards for token ring.

FIG. 7 shows a flow chart of the controller program according to the teachings of the present invention.

DETAILED DESCRIPTION

Figure 1:
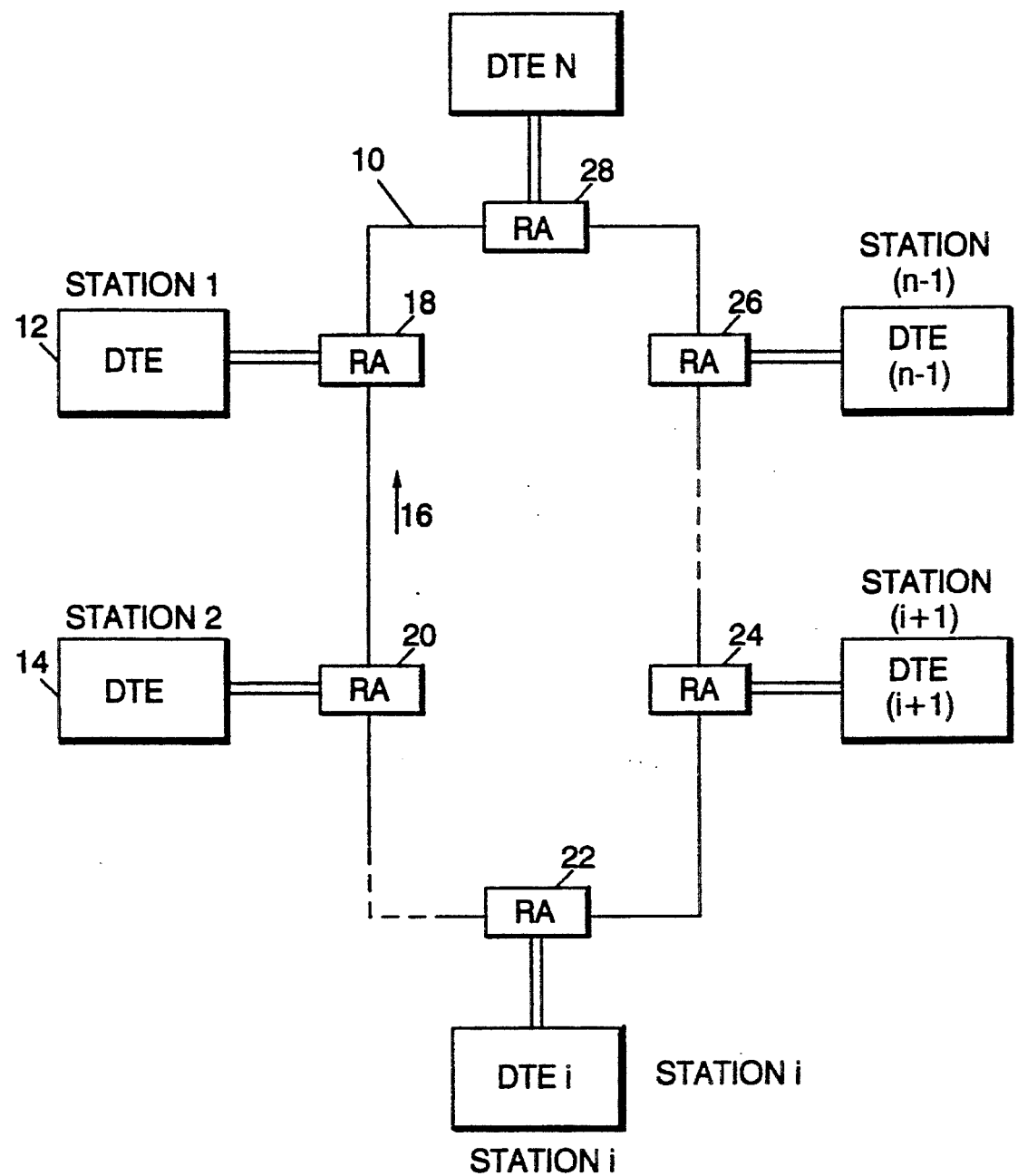
FIG. 1 is a block diagram of a communications network in which the present invention may be used.

FIG. 1 shows a serial communications network in which the present invention (to be described hereinafter) may be used. The serial ring communications network includes a closed loop unidirectional transmission media identified by numeral 10. The closed loop unidirectional transmission media interconnects a plurality of data terminal equipment (DTE) or data terminal units (DTU) 12, 14, .... i, i+1, ... n−1 and n. Each data terminal unit may include one or more devices such as word processor, display terminals, microcomputers or PCs, data collectors, telephone type apparatus, etc. The function of the communications network is to provide the mechanism by which data or other information can be distributed between the devices on the network. Data transmission in the network is unidirectional in the direction shown by 16. Each DTE is connected to the transmission media 10 by ring adapter (RA) 18, 20, 22, 24, 26, 28, respectively. The function of the ring adapter is to provide the required data processing function so that the DTE which the adapter attaches to the network can be designed independently of the requirement for information transmission on the network. To this end, the ring adapter performs ring protocol functions to be discussed hereinafter, which enable the free movement of data on the ring without impacting the design of the data terminal equipment. The structure and operation of the ring adapters are identical, therefore, the description of the improved adapter to be given hereinafter is applicable to all the adapters used in this communication network.

Still referring to FIG. 1, for purposes of description, each ring adapter and its connected DTE is referred to as a station. For example, station 1 includes data terminal 12 and ring attachment or adapter 18. Likewise, station 2 includes data terminal 14 and ring adapter 20 and so forth. Even though the ring adapter is shown as a separate unit from the data terminal equipment in FIG. 1, in a practical system, the adapter is plugged into an expansion slot in the housing of the DTE which it connects to the ring. For example, the IBM Token Ring Network Adapter card which embodies the teaching of the present invention, plugs into an IBM PC expansion slot and interconnects the PC to the communications media.

Figure 2:
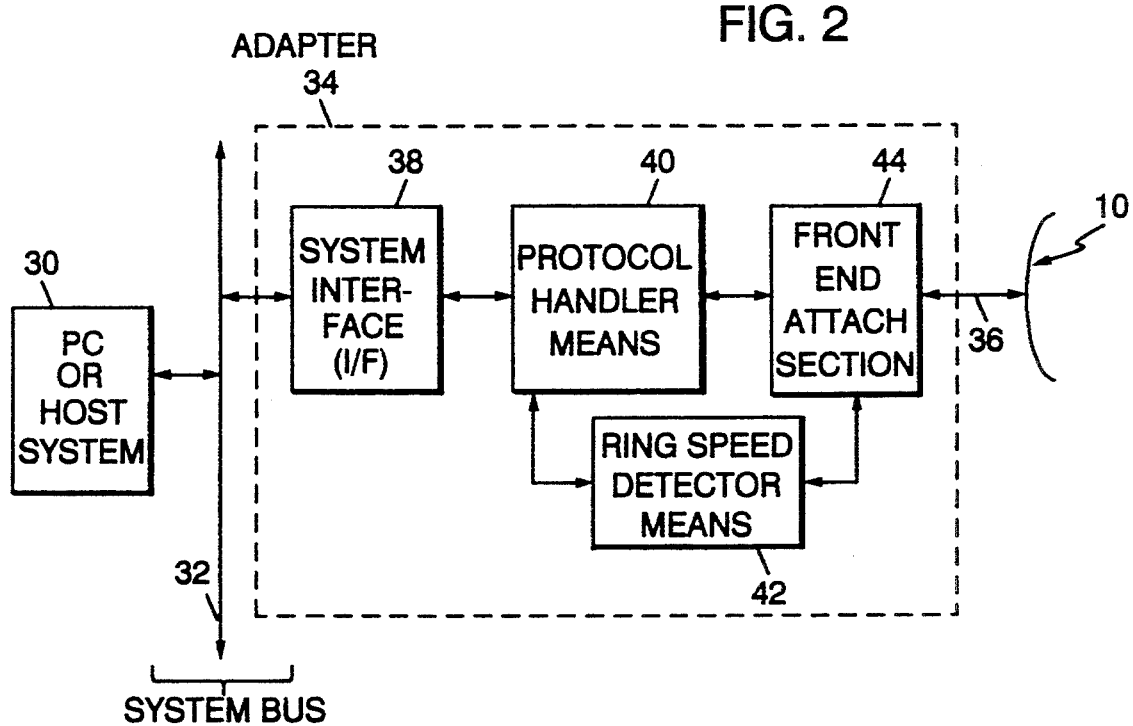
FIG. 2 is a functional block diagram of an adapter embodying the teachings of the present invention.

FIG. 2 shows a functional block diagram of a station in FIG. 1. The stations are functionally similar and, the description in FIG. 2 is intended to cover the other stations. The station is comprised of a personal computer (PC) system 30 interconnected through a system bus 32 to adapter 34. The adapter, in turn, is connected via connector means 36 to transmission media 10. The system connector means 36 may include conventional units, such as transformers, etc., which are used to attach front end attachment section 44 to transmission media 10. The adapter 34 includes system interface (I/F) attachment section 38, protocol handler means 40, front end attachment section 44 and ring speed detector means 42. Even though the elements 38, 40, 42, and 44 are shown as separate blocks in the adapter, in an actual implementation all components may be integrated into a single chip or a plurality of chips depending on the design selection made by the designer. This being the case, the showing of the adapter as separate components are for purposes of describing the invention, only, and does not limit the scope or spirit of the present invention.

Still referring to FIG. 2, the front end attachment section 44 interfaces the adapter to the token ring. The front end attachment section 44 includes a grouping of conventional electronic circuits which, among other things, perform electrical signals conversion on data which is slated for transmission onto the ring and data which is received from the ring. The front end attachment section 44, among other things, also performs modulation and demodulation functions. The ring speed detector means 42 (details to be given hereinafter) monitors the ring to detect the speed at which the ring is operating and hence, allows the station to be inserted in the ring at the ring's speed. As stated previously, insertion at the wrong speed unnecessarily creates error conditions which could render the entire network inoperable. In addition to detecting the data rate of the network, the ring speed detector means 42 also determines when a station can function as a monitor station.

The network operates in accordance with the IEEE 802.5 standards for local area networks. The standard defines a monitor station as a station which controls the network and provides necessary functions which are required for the network to operate satisfactorily. As will be discussed subsequently, the monitor station provides a token for the network, restarts the network if the token is lost, etc.

The protocol handler means 40 is a grouping of circuitry which performs bit and byte level functions. The functions include encoding and decoding data, handling token ring protocols according to the IEEE 802.5 standards, generating and detecting delimiters, generating and checking cyclic redundant check (CRC), decoding addresses, etc. The functions are primarily those set forth in the IEEE 802.5 standards for local area network and other functions covered by the present invention, to be described subsequently.

The system interface (I/F) attachment section 38 interfaces the adapter to the system bus 32. It should be noted that the system bus 32 is part of the PC system 30. In reality, the system bus is under the cover of a personal computer, such as a PS/2$^R$ personal computer or similar devices and the adapter is plugged into the bus. However, for discussion purposes, the system bus 32 is shown as a separate entity from the PC system 30. In addition, the PC system 30 would include a keyboard, through which data can be entered into the system, a printer for printing data and a CRT for observing information to be inputted into the system and outputted from the system. The Input/Output (I/O) devices are well-known in the art and, as such, the I/O devices are not discussed further.

Figure 3A:
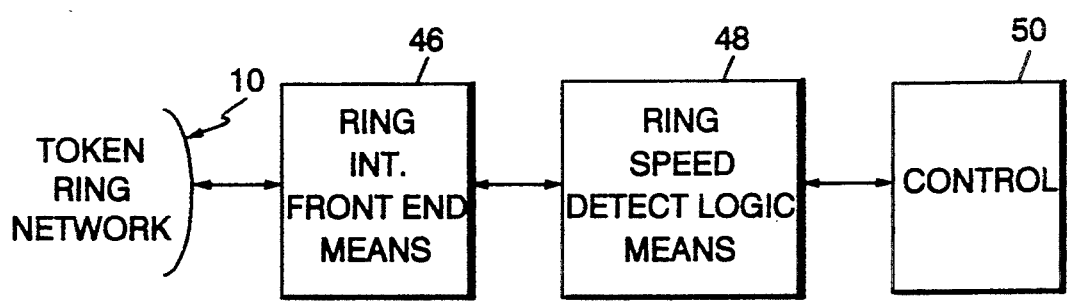
FIG. 3A shows a functional block diagram of the ring speed detector means.

FIG. 3A shows a functional block diagram of the ring speed detector means. As stated previously, the blocks are merely a way of representing the functional characteristics of our invention for discussion purposes and do not limit the scope of the invention. As stated previously, the circuit and/or modules used to implement the ring speed detector means 42 is a matter of design choice. For example, portions of the ring speed detector 42 could be fabricated in the front end attachment section 44 (FIG. 2), while other portions are implemented in protocol handler means 40 (FIG. 2).

Still referring to FIG. 3A, the ring speed detector means 42 is comprised of a ring interface front end means 46, a ring speed detect logic means 48 and a controller 50. The ring interface front end means 46 is appropriately coupled to communications media 10 of the token ring network. The ring interface front end means 46, details of which are given hereinafter, provides a dual front end signal processing system which receives signals from the token ring network and generates data signals and clock signals therefrom. The ring speed detector logic means 48 and controller 50 utilize the data signals and clock signals received from the ring interface front end means 46 to determine the speed at which the token ring network is operated and to generate control signals for disabling selected ones of the front end processing systems which may be operating at a speed different from the speed at which the token ring network is operating. The ring speed detector logic means 48 and the controller 50 also determine if a station is first on the token ring network and, in that case, declare the station as the monitor station for the network. When the station is declared a monitor station, it is free to use a data rate commensurate with the capabilities of the token ring network.

Figure 3B:
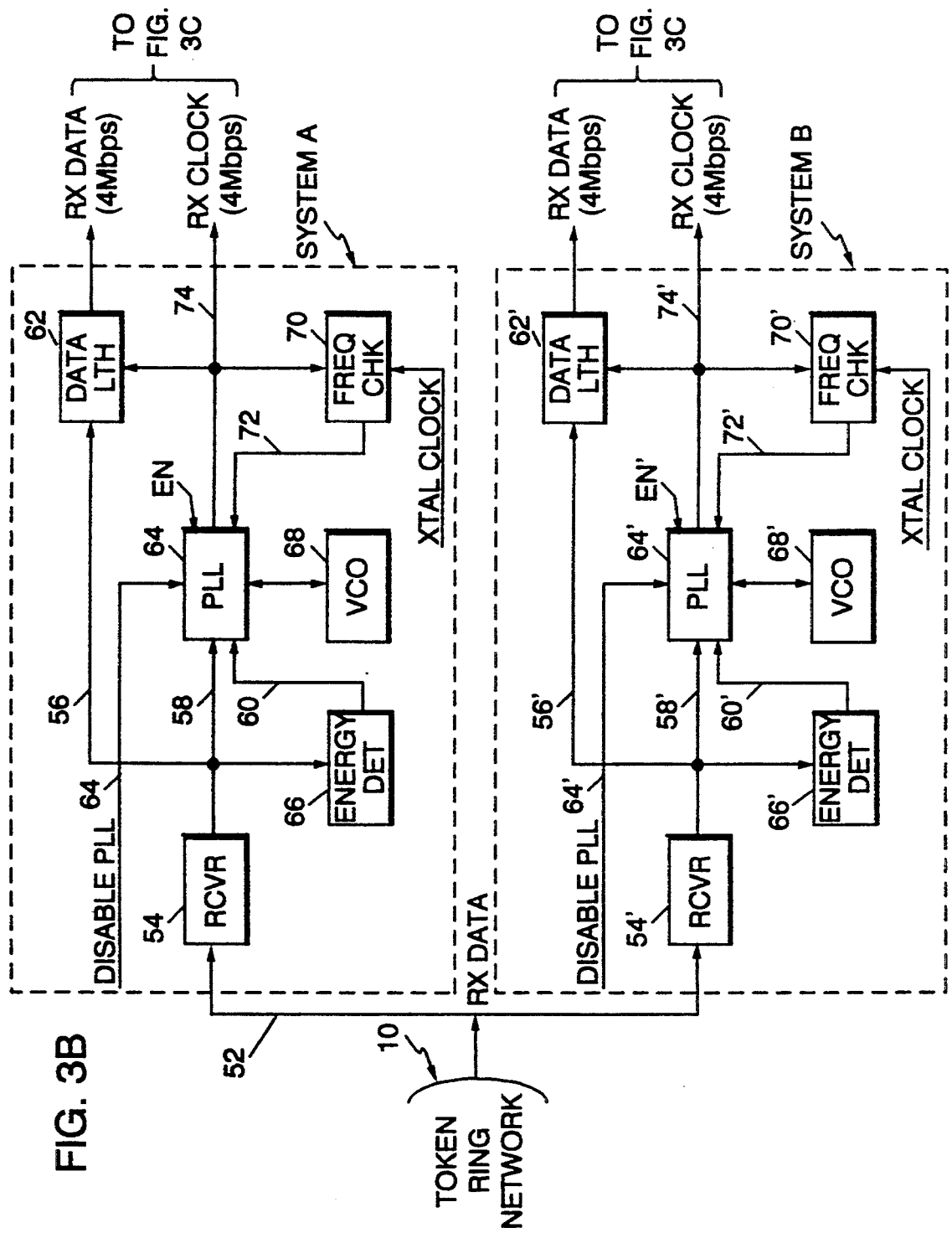
FIG. 3B shows a circuit block diagram for the ring interface front end section.

FIG. 3B shows a circuit block diagram of the ring interface front end means 46. The ring interface front end means 46 is a plurality of multi-path processing systems with each one of the multi-path processing systems being controlled to operate at a different data rate to recover a predetermined signal pattern from the token ring network. The processing system operating at a data rate similar to the token ring network will be able to recover the predetermined signal pattern. Once the signal pattern is detected, the other non-conforming front end systems are shut down (i.e., deactivated) and, thereafter, the system which is able to recover the predetermined signal pattern is used to interface the DTE to the token ring.

Before describing the details of the multi-path front end processing systems, it is worthwhile referring to FIGS. 4A–4E which show signal patterns on a token ring network. In particular FIG. 4E shows a graphical representation of the predetermined signal pattern which each one of the multi-path front end system strives to recover. In the preferred embodiment of the invention, the signal pattern is the token. Of course, it is well within the skill of one skilled in the art to select another pattern without deviating from the teachings of the present invention. As stated previously, the token ring network is designed and controlled in accordance with the IEEE 802.5 standard for local area networks. Among the various management bit patterns defined by the standard is the so-called "token". The token is comprised of a special bit pattern (3 bytes long) which a station has to have before it enters the token ring network. Details of the IEEE 802.5 standard for local area networks are set forth in "IEEE Project 802 Local Network Standards. The manual sets forth details of the standards for the token ring network and are included herein by reference. Suffice it to say that the token comprises a starting delimiter (SD) field which is one octet long, an access control (AC) field which is one octet long and an ending delimiter (ED) which is one octet long.

FIGS. 4A–4D show a graphical representations of a frame and fields of the frame. The frame contains a starting delimiter (SD), access control field (AC), frame control field (FC), destination address (DA), source address (SA), information field, frame check sequence (FCS), ending delimiter (ED), and frame status field (FS). The frame header consists of the SD, AC, FC, DA and SA fields. The frame trailer consists of the FCS, ED and FS fields. FIGS. 4B and 4C show the starting delimiter and ending delimiter data patterns, respectively. In IEEE 802.5 token ring application, only the first six bits of the ending delimiter are considered in decoding the pattern; the last two are ignored. The I-bit, which is used to indicate whether a frame is an intermediate frame or the last frame, follows in the first half of bit number 6. The I-bit is set by the transmitter to indicate whether the transmit frame is the last frame or an intermediate frame. A zero in the I-bit indicates the last frame. A one in the I-bit indicates an intermediate frame. FIG. 4D shows the bit pattern of the access control byte. The token indicator (TI) bit is used to indicate whether a frame (TI=1) or a token (TI=0) is being transmitted.

Referring again to FIG. 3B, in the preferred embodiment of this invention dual front end processing systems labeled system A and system B are interconnected through transmission media 52 to the token ring network. The point labeled as RX data on media 52 is the ring receive Manchester data. As is set forth in the 802.5 protocols, the token ring is able to operate at two permissible speeds. The permissible speeds are 16 Mbps and 4 Mbps. Thus, in accordance with the teaching of this invention, the system labeled System A operates at 4 Mbps and will recover 4 Mbps data from token ring network. Similarly, the system B operates at 16 Mbps and will recover data which is transmitted on the token ring at 16 megabits per sec. It should be noted that the 4 and 16 megabit per second are only for a particular type of token ring. However, the teaching in this invention is applicable to a network running at speeds other than 4 and 16 Mbps. In other words, the invention relates to a network operating at n different data rates. In such a network, the number of systems attached to the network would be equivalent to the permissible range of speeds at which the network can be operated. For example, if the permissible range of operation of the network is three different speeds, then three independent systems, each running at a rate equivalent to the permissible speed on the network, would be coupled to the network.

Still referring to FIG. 3B, system A is made to operate and is seeking to recover data on the network when the network is operating at a speed of 4 Mbps. Similarly, system B is made to operate and is striving to recover data when the token ring network is operating at 16 Mbps. Since the components in each of the systems A and B are identical, common numerals will be used to identify each block in the respective systems with a prime designation identifying the blocks in system B. In addition, since the blocks are identical and operate the same for its respective data rate, only the blocks in system A will be described, it being understood that the blocks in system B operate in the same way except they are running at a 16 Mbps speed.

Still referring to FIG. 3B, System A includes receiver 54 having an input connected to media 52 and an output connected by conductors 56, 58 and 60 to data latch 62, phase lock loop (PLL) 64, and energy detector 66, respectively. The output from energy detector 66 is fed into PLL 64. Voltage controlled oscillator (VCO) 68 is connected to PLL 64. A signal labeled disable PLL 64 is coupled over a conductor to PLL 64. As will be explained subsequently, the signal disabled PLL 64 will disable system A when the predetermined pattern (token) is detected by system B.

In a similar manner, disabled PLL 64' disables system B when the token is detected by system A. Another signal labeled enable (EN) is coupled to PLL 64. The signal is active when the controller (to be described hereinafter) wants to activate system A. The frequency clock 70 is coupled over conductor 72 to PLL 64 and conductor 74 to data latch 62. The output on conductor 74 is receive (RX) 4 Mbs clock and the data signal from data latch 62 is the RX 4 Mbs data signals. Similarly, the signal from data latch 62' is a 16 Mbs receive data signal and the clock on conductor 74' is the RX 16 Mbs clock. The signal labeled XTAL clock is the system clock which is fed into frequency check 70.

Still referring to FIG. 3B, the receive signal goes through analog receiver 54 which shapes up and equalizes the signal for processing in the downstream components. The receive data goes to the phase lock loop 64 which operates in conjunction with the variable control oscillator 68 to lock in to the individual data rate and to extract the RX clock signal from the data transitions. It should be noted here that PLL 64 is a conventional phase lock loop which is well known in the art and further details will not be give. Similarly, VCO is voltage control oscillator which is well known in the prior art and further details will not be given. In parallel with the PLL, the electrical state of the incoming signals are monitored by the energy detector 66 to determine if there are any valid signal in the receive input base or individual data rate. The energy detector 66 counts the number of signal transitions within a fixed window period to determine a valid or invalid signal. The extracted receive clock from the output of the PLL is fed to a data latch 62 which samples the raw, received data to generate the clock receive data outputted and labeled RX data which is in the well-known differential Manchester encoded format. In addition, the frequency error checker 70 monitors RX clock signal to ensure that the frequency of the RX clock is within specified tolerance.

Figure 3C:
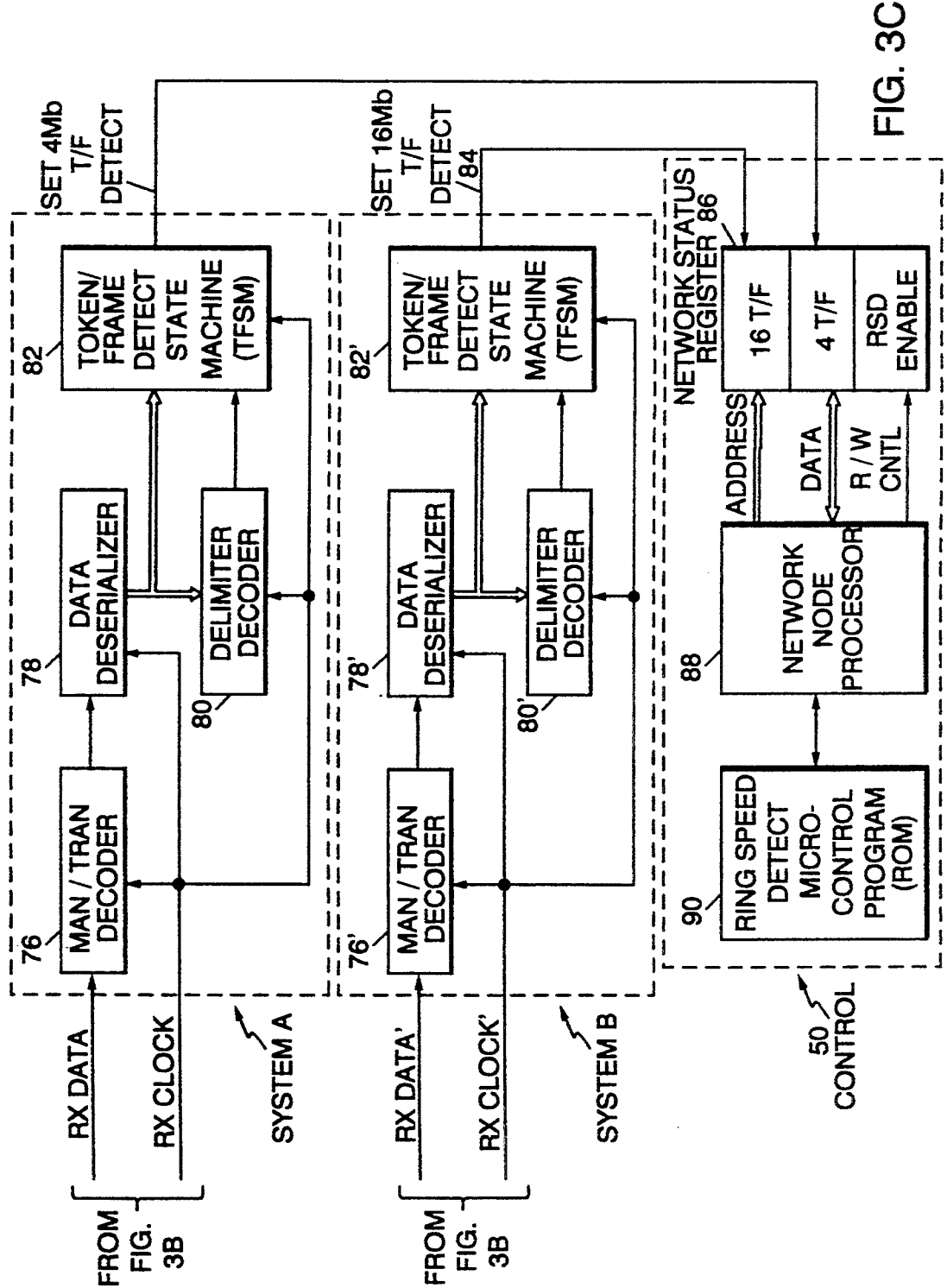
FIG. 3C shows a circuit block diagram for the ring speed detector logic means and controller.

FIG. 3C shows a circuit block diagram of the ring speed detect logic means 48 and controller 50 (FIG. 3A). The ring speed detector logic means 48 is also a dual system which receives output from system A and system B respectively. To this end, the portion of FIG. 3B receiving and processing signals from system A is labeled system A. Likewise, the portion of FIG. 3C which receives signals from system B, FIG. 3B, is labeled system B. As with FIG. 3B, FIG. 3C System A operates at 4 Mbps, while system B operates at 16 Mbps. The components (to be described hereinafter) in both system A and system B, FIG. 3C, are identical and function in a similar manner, except for the difference in speed at which they are operating. To make the description less cumbersome, common numerals are used in FIG. 3C with components in system B identified with single prime notation.

Still referring to FIG. 3C, system A includes Manchester to transitional data decoder (MAN/TRAN DECODER) 76. The MAN/TRAN DECODER 76 is connected to data serializer 78. The output from data deserializer 78 is connected to delimiter decoder 80 and token monitor state machine 82. The signal labeled RX clock is connected to MAN/TRAN DECODER 76, data deserializer 78, delimiter decoder 80 and token monitor state machine 82. The output from token monitor or token frame state machine 82 is a signal labeled SET 4 Mb TOKEN FRAME(T/F) DETECT which is fed over conductor 84 into a bit position of the network status register 86. The bit position is labeled "4 TOKEN", meaning that when the bit is set, the token is recovered by a system running at 4 megabits per second. This also indicates the ring speed is 4 megabits per second.

Similarly, when the token is recovered by the circuitry operating at 16 megabits per second (System B), the bit labeled "16 T/F" (TOKEN FRAME) in the network status register 88 is set. The network status register 86 has another bit labeled RSD enable. This bit is set when the network node processor which is coupled via an address bus, a data bus and control line (R/W CNTL) to the network status register 86 wishes to activate the dual detection system. The network node processor 88 is a microprocessor together with read only memory (ROM) labeled "ring speed detector microcontrol program" containing a special coded control software program. Details of the control code and how the processor operates to control the network will be given subsequently.

Figures 5A, 5B:
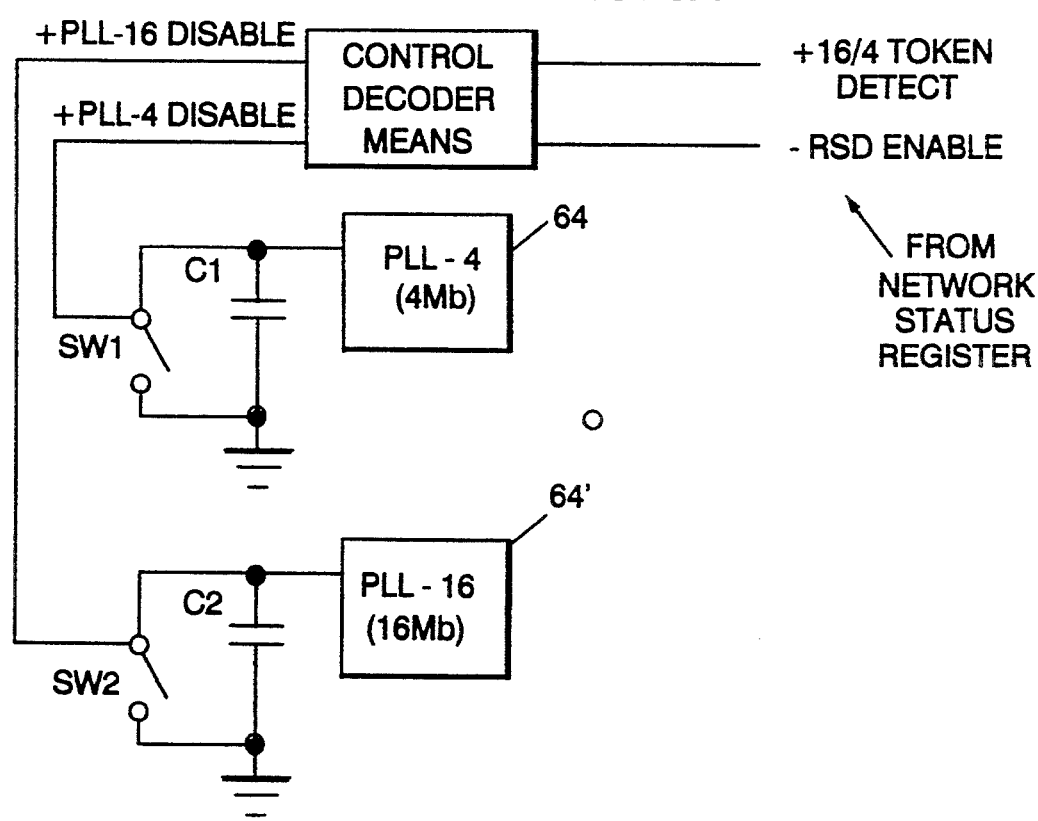
FIGS. 5A and 5B show a controller for generating enable/disable signals.

FIG. 5A shows a circuit arrangement which is coupled to the network node processor to generate the control signals for enabling or disabling the respective systems in FIG. 3B.

The circuit arrangement is comprised of two phase lock loops (PLL) namely PLL-4 and PLL-16, which are operating at 4 Mbps and 16 Mbps speed respectively. Connected to each PLL is a VCO control voltage filter capacitor (C1, C2) and a parallel solid-state switch (SW1, SW2) with one side connected to ground. The solid state switch will be "closed" if the control input is at the HIGH level (logical '1'). It will be in the "open" position if the control input is at the LOW level (logical "0").

Also in the circuit structure is a control decoder which decodes the two input signals ("+16 T/F detect" and -RSD enable") and generate the "PLL-16 disable" and "PLL-4 disable" signals which are the control inputs to SW1 and SW2.

FIG. 5B shows a truth table of the control decoder. It shows that when the ring speed detector is enabled (RSD enable=0), (cases 1 and 2), both PLL-4 and PLL-16 are enabled. When the ring speed detector is disabled (RSD ENABLE=1), if a 16-T/F is detected (case 4), the "PLL-4 disable" signal will go HIGH which will disable the PLL-4. However, if in the same mode and a 4-T/F is detected (case 3), the "PLL-16 disable" signal will go HIGH which will disable the PLL-16.

Referring again to FIG. 3C, the RX data and RX clock from system A (FIG. 3B) are the primary inputs to the ring speed detector logic function for detecting 4 megabits per sec token. Similarly, the "RX data" and the "RX clock" from system B are the primary inputs to the 16 megabit per sec ring speed detector logic function for detecting 16 MBS token. As is obvious in FIG. 3C, the token detect processing is also performed with dual detection paths. Each detection path consists of similar components. The Manchester to Transitional (MAN/TRAN) decoder 76 is a converter which converts differential Manchester encoded data to binary digital data. The data deserializer 78 converts the serial received data into parallel form so that the delimiter decoder 80 can decode the data pattern of the start delimiter (SD) and the end delimiter (ED) of the token. Also, attached to some of the bits at the parallel data interface is the token/frame detect state machine 82. The token/frame detect state machine 82 controls the sequence of the token detect based on individual data rate and delimiter and data by sequence.

Figure 6:
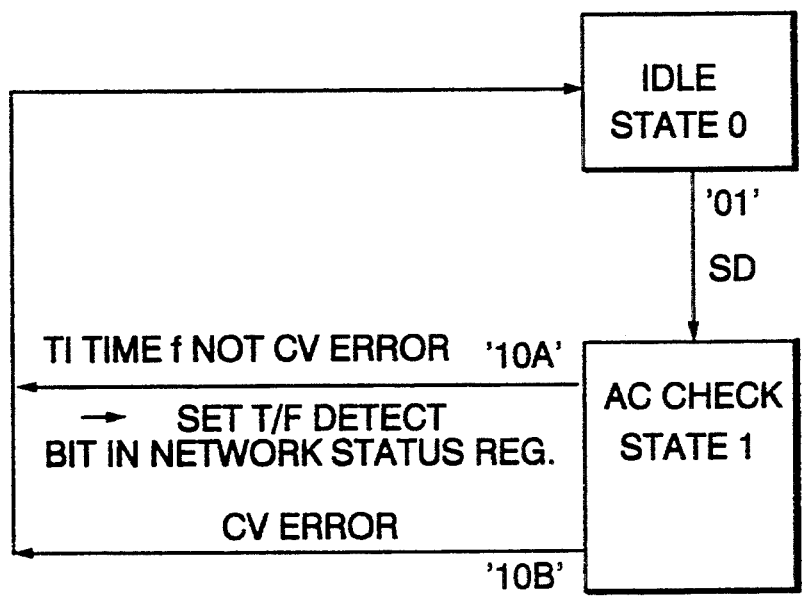
FIGS. 6 shows a flow chart for the token monitor state machine (TMSM).

Referring now to FIG. 6, the Token/Frame Detect State Machine (TFSM) is shown. The operation of the TFSM is as follows. When the adapter is first started, the TFSM will be initialized to be in the idle state. If when a starting delimiter (SD) of a token or a frame is detected, the TFSM will exit (exit 01) from the idle state to the AC check state. While in the AC check state, the TFSM will monitor the first three bits (PPP bits) of the incoming token or frame check for code violations. If code violation is detected in any one of the PPP bits, it will exit (exit 10B) back to idle state. If all the three PPP bits are good, the TFSM will exit (exit 10A) back to the idle state. At the same time, during this exit (exit 10A), the TFSM will set the "T/F detect" signal which is used to set the "16 T/F" bit or the "4 T/F" bit depending on which one is true in the network status register.

Referring to FIG. 3C, the output of the TFSM 82 is a signal labeled "Set 4 MB T/F Detect" which controls the setting of a bit in network status register 86. In the preferred embodiment of the invention, reg. 86 is a software readable register. As is seen in the figure, a similar bit for the 16 megabit per second recovery system is set by the signal labeled "SET 16 Mb T/F DETECT". In addition, in the same software control register, is a control bit labeled Ring Speed Detect Enable (RSD Enable) bit which is also readable and writable by the software through the network node processor 88. The disabling of this bit will shut down the alternate PLL (i.e., the PLL which operates at the opposite rate). This is done by the operating software at the end of the ring speed detection process to be described subsequently. The program for operating the network node processor is stored in the ring speed detect microcontrol program ROM 90 and is described hereinafter.

FIG. 7 shows a flow chart illustrating the control program stored in ROM 90 (FIG. 3C) and is used to control the ring speed detector. The program is executed by Network Node Processor 88 (FIG. 3C). The first step in the program is the "Ring Insertion Routine (block 92) wherein the adapter is inserted into the ring with the user defaulted ring speeds (4 Mbps or 16 Mbps). After insertion, the program sets the (RSD ENABLE) bit of the network status register 86, FIG. 3C, to a logical 1. This enables (activates) the dual path token detection mechanisms (System A and System B, FIGS. 3B and 3C). The program then descends into block 94 where it starts to poll the state of the opposite token/frame detect bit (alternate T/F detect bit) in the network status register (FIG. 3C) every thirty milliseconds. The program then descends into block 96. If the program senses two consecutive alternate T/F detects based on the alternate token/frame detect bit, it will conclude that the adapter has been inserted with a speed different from the actual speed of the ring (block 98). In this case, the program then descends into block 100 where it de-inserts the adapter from the ring to eliminate further ring impact and data corruptions. The program then enters block 102 where it turns off the RSD enable bit, which in turn, turns off the alternate speed PLL. The program then continues the adapter open process to bring the adapter into normal opened state. The additional adapter opening process is beyond the scope of this invention and further description is not given.

Still referring to FIG. 7, and in particular to block 96, if the program does not sense two consecutive alternate token detects with the 30 millisecond polling for a maximum window of 18 seconds, it will also check if it received any frames (see FIG. 4D) during the same period. If it receives any frames, it will conclude that the adapter is inserted with the right ring speed (block 106). In this case, the program descends into block 108 where it turns off the RSD ENABLE bit which, in turn, turns off the alternate speed PLL. Then, it will continue the open process (block 110) to bring the adapter into the normal operating state.

Still referring to FIG. 7, if in block 104, the program does not receive any monitor frames during the 18 second window (block 112), the program will conclude that it is the first and only adapter in the ring. It will turn off the RSD enable bit which, in turn, turns off the alternate speed phase lock loop. After this, it will continue the adapter open process with the original inserted ring speed to bring the adapter into the normal operating state.

Even though the present invention has been described with a specific embodiment, it should be noted that it is well within the skill of one skilled in the art to change the embodiment in minor respect without departing from the spirit and scope of the present invention. Any such changes are deemed to be covered by the present invention.

Having thus described our invention, what we claim as new and desire to secure by Letters Patent is:

1. A device for determining the rate at which information is being transmitted on communications networks including a LAN, comprising:

two signal processing systems operatively coupled to the network, with each one of the two signal processing systems operating at a different data rate and the two signal processing systems outputting at least one control signal indicating that a predetermined bit pattern has been detected on said network; wherein said each one of the two signal processing systems includes a ring interface front end means for converting signals received from the network into data signals and clock signals said ring interface front end means including receiver means to receive signals from the network; said receiver means shaping, equalizing and forwarding shaped and equalized signals downstream; and a speed generating circuit means, coupled to the receiver means, said speed generating circuit means setting a speed for said each one of the two signal processing systems and extracting the clock signals from the shaped and equalized signals;

a ring speed detect logic means, coupled to the speed generating circuit means; said ring speed detect logic means responsive to the data signals and the clock signals to detect therefrom the predetermined bit pattern and generating at least one control signal from the at least two signal processing systems; and a control means operatively coupled to the two signal processing systems; said control means receiving the at least one control signal from the two signal processing systems and deactivating all but one of the two signal processing systems.

2. The device of claim 1 wherein the speed generating circuit means includes a phase lock loop (PLL); and a voltage control oscillator coupled to the phase lock loop.

3. The device of claim 2 further including an energy detection means, coupled to the receiver means, to monitor and detect the shaped and equalized signals.

4. The device of claim 3 further including a storage means coupled to the receiver means.

5. A device for determining the rate at which information is being transmitted on communications networks including a LAN, comprising:

two signal processing systems operatively coupled to the network, with each one of the two signal processing systems operating at a different data rate and the two signal processing systems outputting at least one control signal indicating that a predetermined bit pattern has been detected on said network; wherein said each one of the two signal processing systems includes a ring interface front end means for converting signals received from the network into data signals and clock signals; and a ring speed detect logic means, coupled to the ring interface front end means and including a first decoder for translating Manchester encoder signals to digital signals;

a deserializer circuit coupled to the first decoder;

said deserializer circuit changing serial signals to parallel signals;

a second decoder for decoding predetermined delimiters coupled to the deserializer circuit; and a monitor state machine for detecting token and setting appropriate bits in a network status register, coupled to the second decoder and the deserializer;

said ring speed logic means responsive to the data signals and the clock signals to detect therefrom the predetermined bit pattern and generating the one control signal; and a control means operatively coupled to the state machine; said control means receiving the at least one control signal of the two signal processing systems and deactivating all but one of the two signal processing systems.

6. An adapter for connecting a data terminal equipment (DTE) to communications networks including a LAN said adapter comprising:

a front end means for coupling to the LAN;

a system interface means for coupling to the DTE;

N signal processing systems, N being an integer greater than 1, operatively coupled to the network with each one of the N signal processing systems operating at a different data rate and said N signal processing systems outputting at least one control signal indicating that a predetermined bit pattern whose frequency is that of a detecting signal processing system has been detected on said communications network; and a control means, operatively coupled to the N signal processing systems and the system interface means; said control means receiving the at least one control signal and deactivating all but one of the N signal processing systems.

7. A circuit arrangement for determining the rate at which information is being transmitted on a multi rate communications network comprising:

a first circuit means coupled to the communications network and operable to recover first data signals and first clock signals at a first data rate representative of one of a plurality of data rates at which the communications network can be operated;

a second circuit means coupled to the communications network and operable to recover second data signals and second clock signals at a second data rate representative of another one of the plurality of data rates at which the communications network can be operated;

a pattern detect logic means operatively coupled to each one of the first circuit means and the second circuit means; said pattern detect logic means being responsive to the first data signals, the first clock signals and the second data signals, the second clock signals respectively to detect one of predetermined bit patterns wherein either one of the predetermined bit patterns if detected indicating a data rate on said multi rate communications network being the same as the data rate on the first circuit means and the second circuit means, respectively, said pattern recognition logic means further generating and outputting one control signal; if the predetermined bit pattern is detected; and a control means coupled to the pattern recognition logic means; said control means monitoring the control signal and deactivating all but one of the circuit means.

8. An adapter for coupling a device to a multi-rate communications network comprising:

a front end means for connecting to the network; said front end means including at least two parallel receive data paths, each data path having therein a first means for recovering from a data stream received from the network a clock signal at a first predetermined frequency; a second means for regenerating data signals at said first predetermined frequency from the data received from said network; and a protocol handler means for executing functions required for sending and receiving messages to and from the network; said protocol handler means including a first data pattern recognition means responsive to the clock signal and the data signals to detect a first data pattern therefrom, a second data pattern recognition means responsive to the clock signal and the data signals to detect a second data pattern; and a controller means responsive to the first data pattern and the second data pattern to cause the adapter to operate at a speed associated with the path which detects the data pattern.

9. The adapter of claim 8 further including a back end means for connecting to a system bus of a computer device.

10. The device of claim 9 further including:

a control decoder means coupled to the network status register;

said control decoder means monitoring selected bits in the network status register and generating control signals therefrom;

at least one switch means to be placed in a first state in response to at least one of the control signals; and a storage means operatively coupled to the at least one switch means; said storage means generating a first voltage level at its output if the at least one switch means is not in the first state and a second voltage level if the at least one switch means is in the first state.

11. In a communications network having a transmission medium, a plurality of data terminal equipment (DTE) coupled to the transmission medium and a protocol for allowing the DTE access to said network, a method for determining the speed at which the communications network is operating comprising the steps of:

(a) providing in each DTE at least two signal processing systems for coupling said each DTE to the transmission medium, with each one of the at least two signal processing systems being able to recover data from said transmission medium at different predetermined data rates;

(b) setting each one of the at least two signal processing systems to operate at one of the predetermined data rates;

(c) monitoring the at least two signal processing systems to determine if any is able to detect a predetermined bit pattern on the communications network;

(d) setting at least one marker, associated with the at least two signal processing systems, by one of the at least two signal processing systems detecting the predetermined bit pattern; said at least one marker if set representing the speed of the communications network; and (e) using the setting of the at least one marker and a controlled marker to deactivate one of the at least two signal processing systems 12. A device for determining the data rate at which information is being transmitted on communications networks including a LAN, comprising:

N signal processing systems, N being an integer greater than 1, operatively coupled to the network with each one of the N signal processing systems operating at different data rates and the N signal processing systems outputting at least a control signal if a predetermined data pattern has been detected on said communications network with the data rate of information on said LAN being a data rate of one of the N signal processing systems detecting the predetermined data pattern;

a control means operatively coupled to the N signal processing systems; said control means being responsive to the control signal to deactivate all but one of the N signal processing systems.

13. In a communications network having a transmission medium, a plurality of data terminal equipment (DTE) coupled through adapters to the transmission medium and a protocol for allowing a DTE access to the network, a circuit arrangement in the adapter to control data rate on the communications network comprising:

a network status register;

a control decoder for generating disable signals coupled to selected bits of the network status register;

at least one Phase Lock Loop (PLL) operatively coupled to the network and being responsive to a signal resulting from a bit being set in the network status register to enter the communication network at a predetermined data rate; and a circuit means operatively coupled to the PLL; said circuit means being responsive to one of the disable signals to deactivate the PLL.

14. The circuit arrangement of claim 13 wherein the circuit means includes a capacitor operatively coupled to the PLL and a voltage source; and a switch means for selectively discharging the capacitor operatively coupled to the control decoder and capacitor.

15. In a communications network having a transmission medium, a plurality of data terminal equipment (DTE) coupled through adapters to the transmission medium and protocols which set conditions under which a DTE may transmit data onto the network and receive data from said network, a method for determining the rate at which the network is operating and inserting a DTE at network speed comprising the steps of:

(a) activating a DTE to receive data from the network at a plurality of predetermined data rates;

(b) monitoring the received data to detect a predetermined data pattern;

(c) if the predetermined data pattern is not recognized within a predetermined time interval, the DTE is inserted at a data rate different from that of the network and the DTE is deactivated, if the predetermined data pattern is recognized within the predetermined time interval, the DTE is inserted at network speed and the station is allowed to continue normal operation.

16. A device for determining the rate at which information is being transmitted on communications networks including a Local Area Network LAN comprising:

N signal processing system operatively coupled to communicate with said network, N being an integer greater than 1;

with each one of the N data processing systems including a first means for causing said each one of the N data processing systems to operate at a predetermined data rate which is different from data rates assigned to any other ones of the N data processing systems;

a second means coupled to the first means, said second means responsive to signals outputted from the first means to detect a predetermined data pattern and to generate a control signal if said predetermined data pattern is detected; and a control means operatively coupled to the second means and responsive to the control signal to store an indicator representing the rate at which information is being transmitted on the network is the predetermined data rate of one of the signal processing systems generating the control signal.

17. The device of claim 16 wherein N=2.

18. The device of claim 17 wherein two-signal processing systems are coupled in parallel to the network and are activated simultaneously.

19. The device of claim 16 wherein the first means includes a circuit arrangement which converts signals received from the network into data signals and clock signals.

20. The device set forth in claims 6, 12, 16 or 19 wherein the predetermined data pattern includes a token as defined by IEEE 802.5 standard.

* * * * *